(No Model.)
L. G. HUGHES.
JELLY COOKER.
No. 522,731. Patented July 10, 1894.
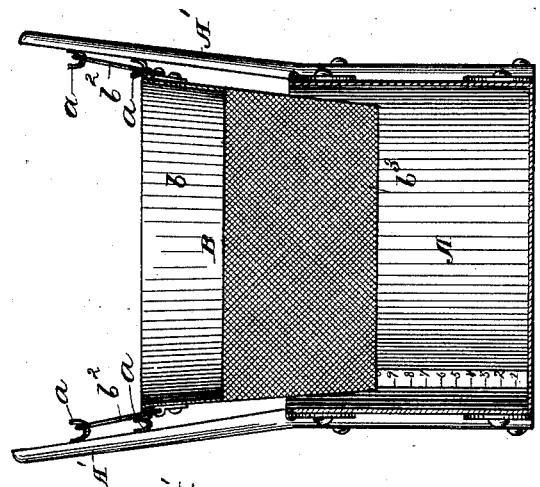
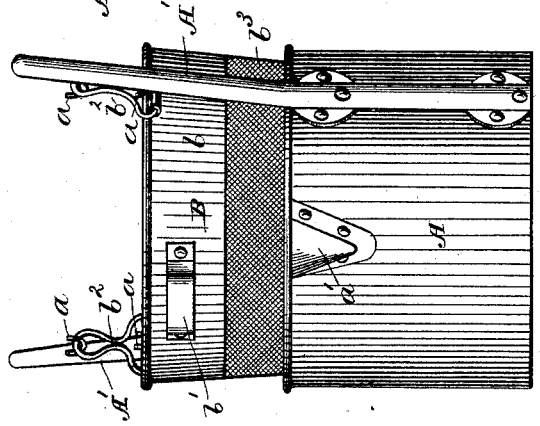
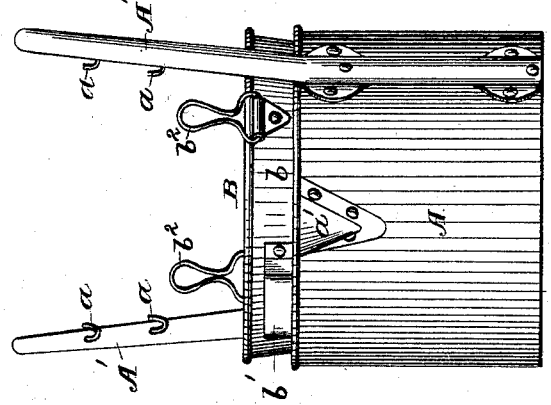
Witnesses,
J. C. Turner
Wm Fechn
Inventor,
L. G. Hughes
By Hall & Fay
Atty's.

UNITED STATES PATENT OFFICE.

LOUISA G. HUGHES, OF CLEVELAND, OHIO.

JELLY-COOKER.

SPECIFICATION forming part of Letters Patent No. 522,731, dated July 10, 1894.

Application filed April 23, 1894. Serial No. 508,584. (No model.)

*To all whom it may concern:*

Be it known that I, LOUISA G. HUGHES, a citizen of the United States, and a resident of Cleveland, county of Cuyahoga, and State of Ohio, have invented certain new and useful Improvements in Jelly-Cookers, of which the following is a specification, the principle of the invention being herein explained and the best mode in which I have contemplated applying that principle, so as to distinguish it from other inventions.

The annexed drawings and the following description set forth in detail, one mechanical form embodying the invention; such detail construction being but one of various mechanical forms in which the principle of the invention may be used.

In said annexed drawings, Figure I represents a side view of my improved jelly cooker, illustrating the strainer in its lowered position, down within the kettle; Fig. II, a side view of the device, illustrating the strainer in its raised position, above the kettle, and Fig. III, a vertical section of the device with the strainer raised.

A kettle, A, of any suitable or desired shape, and provided with suitable means for handling and emptying it, has two uprights, A', secured to its sides, at diametrically opposite points. The inner sides of the uprights have hooks, $a$, at suitable equidistant points, so that the strainer may be supported at different heights above the bottom of the kettle. A strainer, B, is shaped to fit within the kettle, and has a rim, $b$, having handles, $b'$, for manipulating it, and ears, $b^2$, which may engage the hooks upon the uprights to support the strainer above the bottom of the kettle. The lower portion, $b^3$, of the strainer is made from wire netting or similar finely foraminated material.

In practice, the fruit and whatever other ingredients are required for the jelly, are placed in the strainer, and the strainer is placed within the kettle, with its handles resting upon the edge of the kettle, a suitable quantity of water being poured into the kettle to prevent burning of the contents of the strainer and to give the proper consistency to the liquid to be cooked. When the cooking of the fruit is finished, the strainer is raised and supported by its ears upon the hooks, sufficiently high to allow the liquid, which is to form the jelly, to drain off from the pulp and other solids. When all of the liquid is drained off from the solids, the liquid may be further cooked,—if desired,—and the clear liquid which has passed through the strainer, may be poured out of the kettle, at the spout $a'$, into the jars or other receptacles in which the jelly is intended to stiffen and be kept.

As the contents of the strainer may be stirred while the liquid is draining off, it will not be necessary to squeeze or press the pulp, and the liquid will pass through the strainer perfectly clear and free from all solids and particles liable to cloud the liquid.

A gage, $A^2$, is provided upon the inside of the kettle, so that the quantity of liquid may be determined and sugar or other ingredients be added without the necessity of removing the liquid from the kettle for the purpose of weighing or measuring it and of separately weighing or measuring the sugar or other ingredient to be added.

Other modes of applying the principle of my invention may be employed for the mode herein explained. Change may therefore be made as regards the mechanism thus disclosed, provided the principles of construction set forth respectively in the following claims are employed.

I therefore particularly point out and distinctly claim as my invention—

In a jelly cooker, the combination with a kettle provided with uprights having hooks upon their inner sides, of a strainer fitting within the kettle and provided with handles and with ears adapted to engage the hooks, substantially as set forth.

In testimony that I claim the foregoing to be my invention I have hereunto set my hand this 20th day of April, A. D. 1894.

LOUISA G. HUGHES.

Witnesses:
WM. SECHER,
J. C. TURNER.